United States Patent [19]

Savage, Jr.

[11] Patent Number: 5,440,468
[45] Date of Patent: Aug. 8, 1995

[54] LENS CLIP AND CAP FOR LED AND GRIPPED PANEL ASSEMBLY

[76] Inventor: John M. Savage, Jr., 538-B Via De La Valle, Solana Beach, Calif. 92075

[21] Appl. No.: 243,326

[22] Filed: May 16, 1994

[51] Int. Cl.$^6$ .................................................. H01R 33/00
[52] U.S. Cl. ........................................ 362/226; 362/147; 362/311; 362/326; 362/800; 248/27.3
[58] Field of Search ............................ 248/27.1, 27.3; 362/226, 326, 311, 353, 355, 363, 365, 366, 368, 396, 455, 800, 147, 148

[56] References Cited

U.S. PATENT DOCUMENTS

| D. 200,157 | 1/1965 | Vincent | D13/146 |
|---|---|---|---|
| 1,747,896 | 2/1930 | Gates | 439/682 |
| 2,042,199 | 5/1936 | Thomas | 362/226 |
| 2,396,725 | 3/1946 | Thomas, Jr. | 439/590 |
| 2,796,593 | 6/1957 | Offerman | 439/683 |
| 2,829,359 | 4/1958 | Ritter | 439/56 |
| 2,949,595 | 8/1960 | Doeleman | 338/70 |
| 2,951,226 | 8/1960 | Gittens | 439/58 |
| 2,977,562 | 3/1961 | Benson | 439/58 |
| 2,999,895 | 9/1961 | Smith | 174/138 G |
| 3,184,536 | 5/1965 | Vincent | 174/138 G |
| 3,289,200 | 11/1966 | Rueger | 248/27.1 |
| 3,601,786 | 8/1971 | Brubaker | 439/853 |
| 3,621,445 | 11/1971 | Horecky | 439/81 |
| 3,659,093 | 4/1972 | Rieth | 362/366 |
| 3,663,931 | 5/1972 | Brown | 439/75 |
| 3,887,803 | 6/1975 | Savage, Jr. | 362/363 |
| 3,975,072 | 8/1976 | Ammon | 439/70 |
| 4,035,681 | 7/1977 | Savage, Jr. | 313/110 |
| 4,195,330 | 3/1980 | Savage, Jr. | 362/226 |
| 4,219,172 | 8/1980 | Murayama | 248/27.3 |
| 4,398,240 | 8/1983 | Savage, Jr. | 362/311 |
| 4,402,110 | 9/1983 | Savage, Jr. | 16/225 |
| 4,471,414 | 9/1984 | Savage, Jr. | 362/226 |
| 4,491,900 | 1/1985 | Savage, Jr. | 362/230 |
| 4,727,648 | 3/1988 | Savage, Jr. | 29/839 |
| 4,745,535 | 5/1988 | Brunner | 362/365 |
| 4,821,152 | 4/1989 | Lorenzen | 361/767 |
| 4,837,927 | 6/1989 | Savage, Jr. | 29/839 |
| 4,986,772 | 1/1991 | Fukutani | 439/892 |
| 5,068,771 | 11/1991 | Savage, Jr. | 362/255 |
| 5,071,375 | 12/1991 | Savage, Jr. | 439/853 |
| 5,126,929 | 6/1992 | Cheselske | 362/363 |

FOREIGN PATENT DOCUMENTS

| 2390032 | 1/1978 | France . | |
| 1464176 | 2/1969 | Germany . | |
| 2250007 | 5/1974 | Germany . | |
| 2918620 | 11/1980 | Germany . | |
| 1269091 | 3/1972 | United Kingdom | 248/27.3 |
| 2081516 | 2/1982 | United Kingdom . | |

Primary Examiner—Ira S. Lazarus
Assistant Examiner—Alan B. Cariaso
Attorney, Agent, or Firm—William W. Haefliger

[57] ABSTRACT

A light emitting diode assembly attachable to a display panel comprising a light emitting diode having locking structure thereon, the structure defining a boss; a lens cap receiving the diode forwardly therein, clip structure integral with the cap and projecting sidewardly proximate the diode locking structure; the clip structure defining spring fingers projecting rearwardly at the side of the diode, the fingers defining first grooves to receive the boss on the diode, and second grooves to receive portions of the display panel adjacent an opening formed therein; and wherein the spring fingers define serrations presented outwardly at the second grooves for engagement with the portions of the display panel to position the clip structure and lens cap relative to the panel.

14 Claims, 2 Drawing Sheets

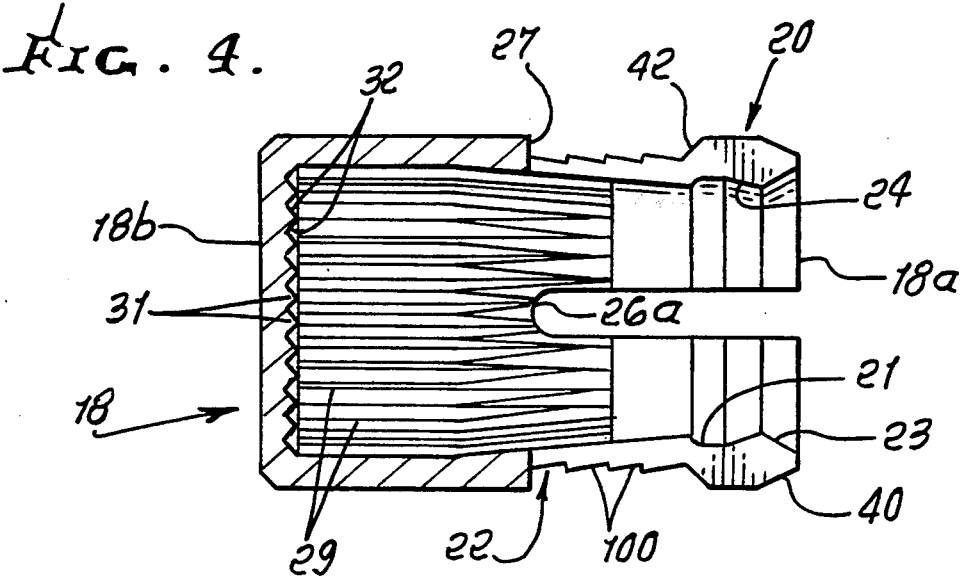
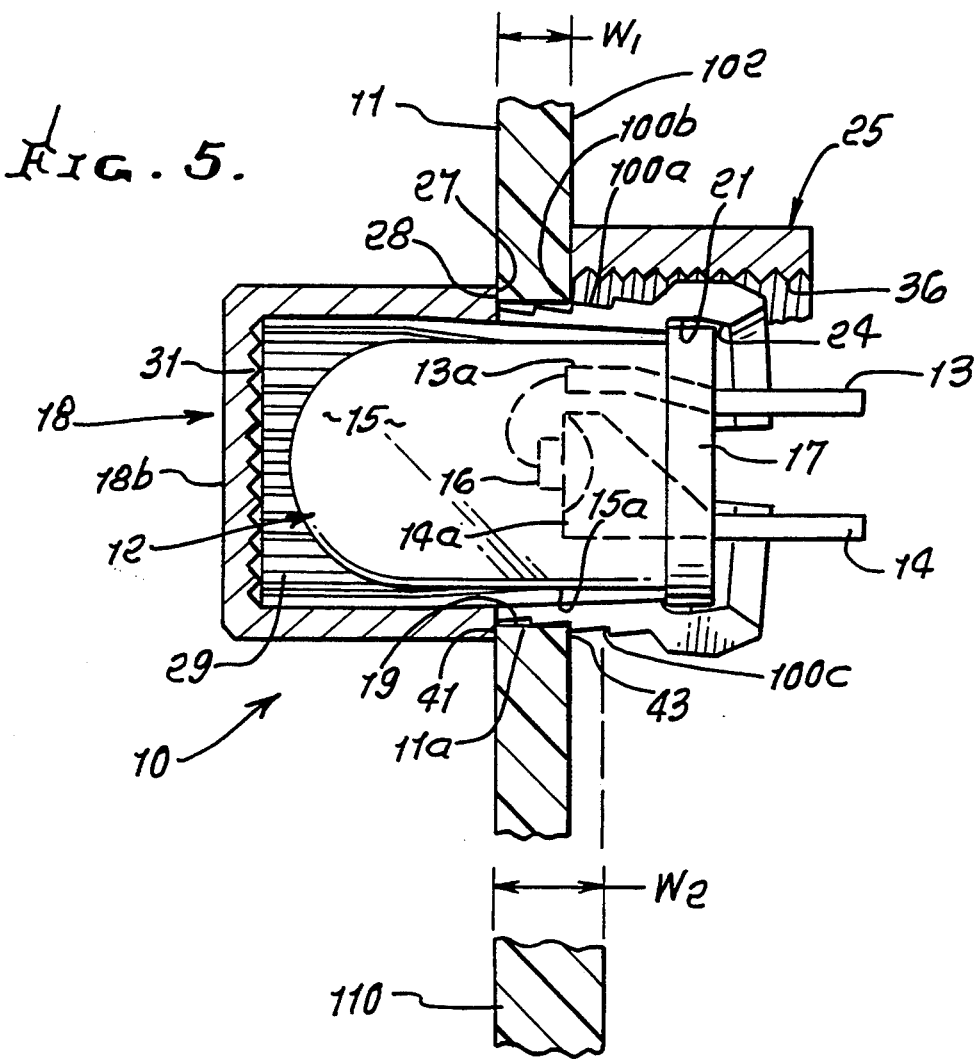

LENS CLIP AND CAP FOR LED AND GRIPPED PANEL ASSEMBLY

BACKGROUND OF THE INVENTION

This invention relates generally to light emitting devices and apparatus; more specifically, it concerns the installation or mounting of such devices to overcome prior problems and difficulties.

In the past, LEDs (light emitting diodes) have been permanently mounted within housings, and the latter were in turn attached or mounted to display panels. The construction was such that removal and replacement of the diodes was made quite difficult. U.S. Pat. No. 3,887,803 disclosed one way in which to more readily remove a diode from its housing; however, such removal necessitated prior detachment of a lens cap. Also, ready removal of the housing itself from the display panel remained a problem. Further, attachment of the diode to its housing, and the housing to the display panel, in the unusually advantageous manner as now afforded by the invention, were not known.

SUMMARY OF THE INVENTION

It is a major object of the invention to provide an assembly offering a solution to the above, as well as other difficulties, with prior LED installations, enabling ready installation and/or replacement of diodes and diode housings in display panels. The invention also extends to installations incorporating incandescent-type light units.

Basically, the assembly comprises:

a) a light emitting diode having locking structure thereon, the structure defining a boss, b) a lens cap receiving the diode forwardly therein, clip means integral with the cap and projecting sidewardly proximate the diode locking structure, c) the clip means defining spring fingers projecting rearwardly at the side of the diode, the fingers defining first grooves to receive the boss on the diode, and second grooves to receive portions of the display panel adjacent an opening formed therein, d) and wherein the spring fingers define serrations presented outwardly at the second grooves for engagement with the portions of the display panel to position the clip means and lens cap relative to the panel.

As will be seen, the lens cap defines an axis and extends axially, the serrations on each spring finger extending in axial succession; also, the serrations are typically urged outwardly adjacent a bore formed by the panel opening, and by sideward force transmitted by the diode.

Another object is to provide a lens cap having slits between the spring fingers, the slits extending forwardly into circularly adjacent relation to the serrations.

Yet another object is to provide a lens cap having a rearwardly facing shoulder to engage a front wall of the display panel, the shoulder extending about the axis to face toward the serrations.

As will be seen, the slits advantageously have forwardmost extents that lie in a plane normal to the axis and which intersects the shoulder.

A further object is to provide certain of the serrations on the fingers with forwardly facing shoulders engaging the rear side of the display panel, adjacent the bore.

Accordingly, the serrations may be spaced apart to accommodate different panel sizes or thicknesses, with desired clamping of said different size panels.

These and other objects and advantages of the invention, as well as the details of an illustrative embodiment, will be more fully understood from the following specification and drawings, in which:

DRAWING DESCRIPTION

FIG. 4 is a section taken on lines 4—4 of FIG. 2; and

FIG. 5 is a section showing an assembly.

DETAILED DESCRIPTION

Figure 1:
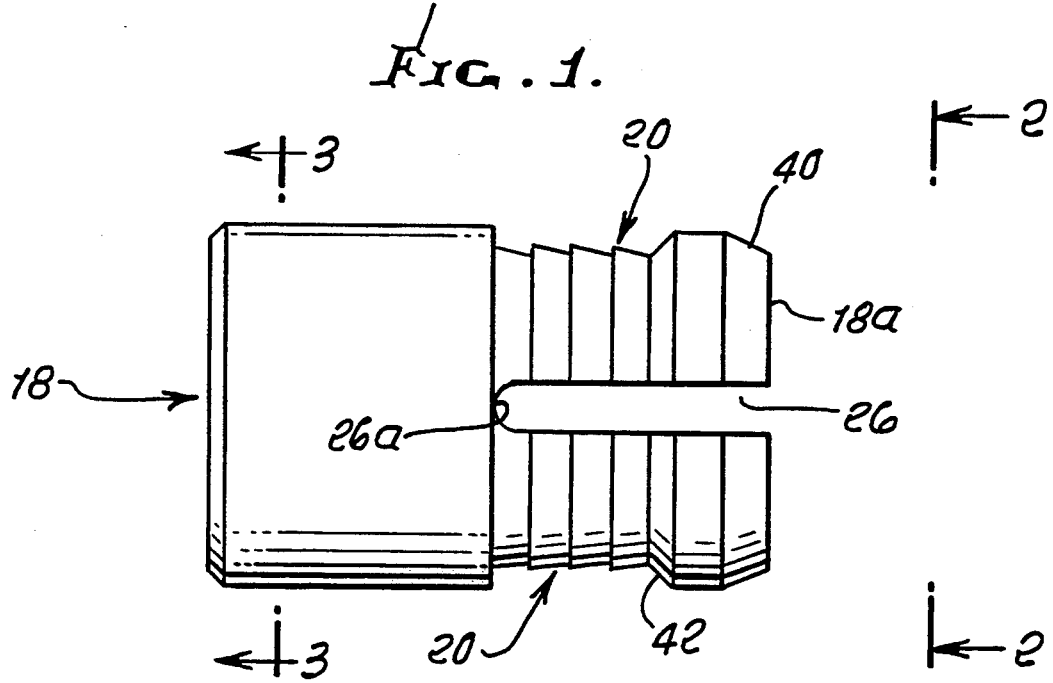
FIG. 1 is a side elevation showing a lens cap.
Figure 2:
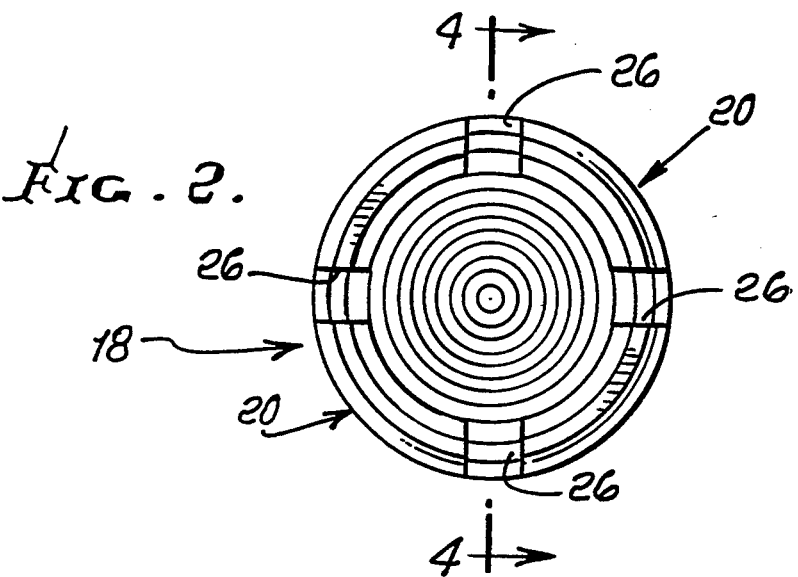
FIG. 2 is an end elevation taken on lines 2—2 of FIG. 1.
Figure 3:
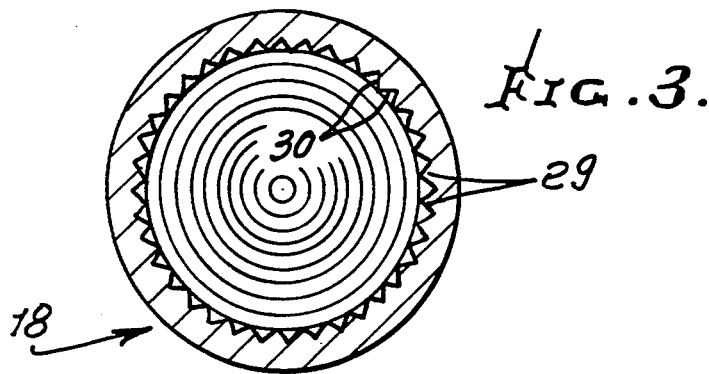
FIG. 3 is an end elevation taken on lines 3—3 of FIG. 1.

The light emitting diode assembly 10 seen in FIG. 5 is attached to display panel 11. The LED 12 includes terminals 13 and 14 projecting rearwardly from housing 15, and also within the latter at 13a and 14a. A luminous chip 16 defines the light-emitting zone of the LED. The LED also includes locking structure, as for example arcuate boss or flange section 17, at the rearward side of the panel 11.

The assembly also includes a lens cap 18 receiving the diode, and clip means integral with the cap projecting proximate the LED locking structure. The lens cap projects axially at the front side of the panel, and the diode 12 projects axially forwardly through a cylindrical bore 19 forming an opening in the panel 11 and within the cap, also at the front side of the panel. The clip means may, with unusual advantage, comprise spring fingers 20 projecting rearwardly through opening 19 at the outer side of the diode; further, the spring fingers have tongue and groove interfit with the diode, at the rear side of the panel. The illustrated interfit or releasable interconnection is defined by the reception of the radially projecting boss 17 into first grooves 21 defined by cantilevered extents of the fingers projecting rearwardly of the panel 11. Note that the spring fingers also define second grooves 22 receiving portions 11a of the panel 11 adjacent the circular opening 19.

The fingers 20 further define first cam surfaces 23 located rearwardly of the grooves 21 to be radially spread by the diode boss 17 in response to forward insertion of the diode into the cap. Surfaces 23 are angled rearwardly and radially outwardly, as shown. In addition, the fingers define second cam surfaces 24 immediately rearward of the grooves 21 and angled rearwardly and radially inwardly to be radially spread apart by the diode boss 17 in response to relatively rearward retraction of the diode from the cap.

Retention of the diode boss 17 in grooves 21 is assured by a retainer urging the clip means spring fingers into interfitting relation with the diode locking structure, i.e., boss 17. As shown, the retainer may comprise a ring 25 having a circumferentially serrated bore 36 in frictional engagement with the spring fingers. The retainer 25 may be omitted, if desired.

It should be noted that four spring fingers 20 may be provided by forming four lengthwise extending slits 26 in the skirt portion of the cap, at 90° intervals about the cap axis. The slits extend forwardly or leftwardly from the rightward end 18a of the cap. The leftward ends 26a of the slits terminate within the bore or opening 19 in the display panel, and at or proximate the plane of an annular cap shoulder 27, which seats against the face 28 of the panel, and which defines the leftward ends of grooves 22. The cap is held in that seated position by serrations 100 formed on the spring fingers and urged outwardly by the diode to engage bore 19. In that position, the cap holds the diode itself, so that the light zone defined by luminous chip 16 is within the bore 19.

Referring to FIGS. 2 to 5, the lens cap 18 has a flat forwardly and leftwardly presented end 18b. Also, the interior bore of the cap defines axially extending, circumferentially spaced serrations 29. Opposed walls 30 of each serration-rib extend at about 90°. Similarly, the cap interior front wall defines radially spaced, circular serrations 31, with opposed walls 32 of each serration extending at about 90°. Such walls refract the light transmitted from the diode through the cap, for providing increased luminosity at local areas of the cap, when viewed from the interior.

FIG. 1 also shows that the spring fingers 20 define third cam surfaces 40 rearwardly of the second grooves 22, and angled rearwardly and radially inwardly to be urged radially inwardly by edge portions 41 of the panel in response to rearward installation of the spring fingers through the opening 19; also, the fingers define fourth cam surfaces 42 rearwardly of and adjacent the grooves 22, surfaces 42 being angled rearwardly and radially outwardly to be urged inwardly by edge portions 43 of the panel in response to forward retraction of the fingers through opening 19. Accordingly, the spring fingers accommodate ready installation of the lens cap 18 to a panel, as well as ready removal of the cap from the panel, without the diode being located within the cap; and ready installation of the diode into the installed cap, as well as ready removal of the diode from the installed cap. The cap, clip means and retainer may consist of any suitable plastic material, which is transparent; however, the relatively hard material, polycarbonate, is preferred for the cap and clip means; and a relatively softer material, polypropylene, is preferred for the retainer, allowing the retainer to deform somewhat as it is assembled over the spring fingers.

As seen in FIG. 5, the serrations 100 on the spring fingers engage the panel 11 to position the clip means and lens cap relatively to the panel. Note that the serrations define ramps 100a and shoulders 100b, the latter extending in planes parallel to the panel side 102. One shoulder 100b on each finger engages that panel side 102, the space between that shoulder and shoulder 27 being equal to the panel width $w_1$. Accordingly, the diode locks to the panel. Another shoulder 100c on each finger is spaced at a greater distance from shoulder 27, that greater distance being equal to the width $w_2$ of another panel indicated at 110, and otherwise like panel 11. Note that ramps 100a extend forwardly and outwardly. A linear succession of such ramps and shoulders is formed in an axial direction on each finger between 42 and 27, for purposes as referred to. Note also the side 15a of the diode envelope engaging the inner sides of the four spring fingers, to forcibly urge them outwardly, as shown holding them in locked position. Slits 26 extend circularly adjacent the serrations 100, and have widths of at least about 0.040 inch, the overall diameter of the lens cap at the serration 100 being about 0.250 inches.

This invention improves over that of my U.S. Pat. No. 4,195,330.

I claim:

1. In a light emitting diode assembly attachable to a display panel, said assembly comprising:
    a) a light emitting diode having locking structure thereon, said structure defining a boss, the diode having a side,
    b) a lens cap receiving the diode forwardly therein, clip means integral with the cap and projecting sidewardly proximate the diode locking structure,
    c) said clip means defining spring fingers projecting rearwardly at the side of the diode, the fingers defining first grooves to receive the boss on the diode, and second grooves to receive portions of the display panel adjacent an opening formed in the panel,
    d) and wherein the spring fingers define serrations presented outwardly at said second grooves for engagement with said portions of the display panel to position the clip means and lens cap relative to the panel.

2. The assembly of claim 1 wherein said lens cap defines an axis and extends axially, the serration on each spring finger extending in axial succession.

3. The assembly of claim 1 including said panel having said opening therethrough, said opening having a bore, said serrations urged outwardly against said bore by sideward force transmitted by the diode.

4. The assembly of claim 2 wherein the lens cap defines slits between said spring fingers, said slits extending forwardly into circular adjacent relation to said serrations.

5. The assembly of claim 4 wherein said lens cap defines a rearwardly facing shoulder to engage a front wall of the display panel, said shoulder extending about said axis to openly face toward said serrations.

6. The assembly of claim 5 wherein said slits have ends that lie in a plane normal to said axis and which intersects said shoulder.

7. The assembly of claim 3 wherein said diode interfits said spring fingers to deflect said fingers radially outwardly relative to said axis.

8. The assembly of claim 1 including a retainer having the form of a ring receiving and extending about said fingers, rearwardly of said serrations.

9. The assembly of claim 1 wherein the lens cap is transparent.

10. The assembly of claim 1 wherein the fingers define cam surfaces rearwardly of the first grooves and angled to be radially spread by said boss in response to rearward retraction of the unit to remove the diode from within the cap.

11. The assembly of claim 3 wherein certain of said serrations on the fingers have forwardly facing shoulders engaging the rear side of the display panel, adjacent said bore.

12. The assembly of claim 11 wherein said serrations also define ramps extending between multiple forwardly facing shoulders.

13. The assembly of claim 4 wherein said slits have width of at least about 0.040 inches, the serrations defining a cylinder having a diameter of about 0.250 inch.

14. In combination
    a) a plastic lens unit having a forward lens portion and a sleeve portion incorporating rearwardly extending circularly spaced spring fingers that are resiliently deflectable toward an axis defined by said unit,
    b) said sleeve portion adapted to be inserted into a mounting panel via an opening in the panel, c) and serrations projecting outwardly on said sleeve portion to be urged outwardly to clamp to a panel bore about said opening, in response to insertion of an LED into said sleeve portion, said serrations forming ramps on each of the circularly spaced spring fingers, d) there being slits that extend circularly adjacent the serrations and between circularly successive spring fingers.

* * * * *